(12) United States Patent
Loza et al.

(10) Patent No.: US 11,738,956 B2
(45) Date of Patent: Aug. 29, 2023

(54) DOOR AND LIGHT CURTAIN CONTROL SYSTEM FOR DEPALLETIZATION SYSTEMS AND METHODS

(71) Applicant: Target Brands, Inc., Minneapolis, MN (US)

(72) Inventors: Carlos Loza, Minneapolis, MN (US); Ernesto Saldana Pena, Minneapolis, MN (US); Gervasio Mutarelli, Minneapolis, MN (US); Gregory Lisso, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/534,728

(22) Filed: Nov. 24, 2021

(65) Prior Publication Data

US 2022/0234844 A1 Jul. 28, 2022

Related U.S. Application Data

(60) Provisional application No. 63/141,775, filed on Jan. 26, 2021.

(51) Int. Cl.
| | |
|---|---|
| *B65G 59/04* | (2006.01) |
| *B25J 15/06* | (2006.01) |
| *B25J 9/00* | (2006.01) |
| *B65G 61/00* | (2006.01) |
| *B25J 9/16* | (2006.01) |
| *B25J 15/00* | (2006.01) |

(52) U.S. Cl.
CPC ............ *B65G 59/04* (2013.01); *B25J 9/0093* (2013.01); *B25J 9/1612* (2013.01); *B25J 9/1687* (2013.01); *B25J 15/0052* (2013.01); *B25J 15/0683* (2013.01); *B65G 61/00* (2013.01)

(58) Field of Classification Search
CPC . B25J 21/00; B25J 19/06; B25J 9/0093; B25J 9/1612; B25J 9/1687; B25J 15/0052; B25J 15/0683; B65G 59/04; B65G 61/00; B65G 59/02; B65G 2249/04; B65G 2249/045; B65G 47/907; B65G 59/00; B65G 59/103; B65G 2201/0267
See application file for complete search history.

(56) References Cited

U.S. PATENT DOCUMENTS

| | | | |
|---|---|---|---|
| 5,280,622 A * | 1/1994 | Tino | B25J 19/06 700/255 |
| 5,605,432 A | 2/1997 | Fink et al. | |

(Continued)

FOREIGN PATENT DOCUMENTS

| | | | | |
|---|---|---|---|---|
| EP | 1893512 B1 * | 3/2009 | | B65G 59/02 |
| WO | WO2006117814 | 11/2006 | | |
| WO | WO-2019240271 A1 * | 12/2019 | | B65G 61/00 |

*Primary Examiner* — Gregory W Adams
(74) *Attorney, Agent, or Firm* — Fish & Richardson P.C.

(57) ABSTRACT

Warehouse automation and methods of handling materials can be used to enhance the safety and efficiencies of warehouse operations. For example, automation systems and methods that make depalletization processes safer and more efficient are described. In some examples, the depalletization systems described herein include multiple work cells/stations and a depalletization robot that traverses the work cells/stations on a rail so the robot can autonomously move between the stations.

11 Claims, 2 Drawing Sheets

(56) References Cited

U.S. PATENT DOCUMENTS

| | | | | |
|---|---|---|---|---|
| 6,626,632 B2* | 9/2003 | Guenzi | ................ | B65G 1/1376 414/789.6 |
| 7,030,363 B2* | 4/2006 | Watanabe | ................ | F16P 3/144 340/552 |
| 7,481,472 B2* | 1/2009 | Cawley | ................ | B65G 61/00 294/907 |
| 8,985,929 B2* | 3/2015 | Enokida | ............ | H01L 21/67178 414/217 |
| 9,030,674 B2* | 5/2015 | Bonin | ................ | B25J 9/1676 700/250 |
| 9,144,906 B2* | 9/2015 | Sauvageot | ............ | B25J 9/1674 |
| 9,737,992 B2* | 8/2017 | Mougin | ................ | B25J 9/1676 |
| 9,968,956 B2* | 5/2018 | Miwa | ................ | B05C 15/00 |
| 10,513,395 B2* | 12/2019 | Nakano | ................ | B65G 1/1375 |
| 2007/0280812 A1* | 12/2007 | Morency | ................ | B65G 61/00 414/729 |
| 2008/0267759 A1* | 10/2008 | Morency | ................ | B65G 60/00 414/788.1 |
| 2009/0295580 A1* | 12/2009 | Inoue | ................ | F16P 3/144 356/614 |
| 2010/0125361 A1* | 5/2010 | Mougin | ................ | F16P 3/144 901/30 |
| 2010/0204829 A1* | 8/2010 | Karlsson | ................ | F16P 3/144 700/245 |
| 2011/0224826 A1* | 9/2011 | Maehara | ................ | B25J 9/1676 700/255 |
| 2012/0163953 A1* | 6/2012 | Murano | ................ | B25J 19/06 414/788.1 |
| 2018/0297201 A1* | 10/2018 | Sawada | ................ | B25J 9/1694 |
| 2018/0327201 A1* | 11/2018 | Verheij | ................ | B65H 1/14 |
| 2019/0001496 A1* | 1/2019 | Lorenzoni | ................ | B25J 19/06 |
| 2019/0030730 A1* | 1/2019 | Tanaka | ................ | B25J 13/087 |
| 2019/0134819 A1* | 5/2019 | Okahara | ................ | B25J 13/08 |
| 2020/0269429 A1 | 8/2020 | Chavez et al. | | |

* cited by examiner

DOOR AND LIGHT CURTAIN CONTROL SYSTEM FOR DEPALLETIZATION SYSTEMS AND METHODS

CROSS-REFERENCE TO RELATED APPLICATIONS

This application claims the benefit of U.S. Provisional Application Ser. No. 63/141,775, filed Jan. 26, 2021. The disclosure of the prior application is considered part of (and is incorporated by reference in) the disclosure of this application.

TECHNICAL FIELD

This document relates to systems and methods for enhancing warehouse material handling operations. For example, this document relates to automation systems and methods that make depalletization processes more safe and efficient.

BACKGROUND

Depalletization is a material handling process which simply means transferring containers (e.g., boxes, totes, etc.) from a pallet or other type of shipping container to a conveyor or other material handling means. Depalletization is a common material handling process that is an important aspect of warehouse operations. The efficiency of material handling processes, such as depalletization, at warehouses is an important business issue for retailers.

The use of warehouse automation is one way to increase the efficiency of warehouse operations such as depalletization and other aspects of material handling and order fulfillment processes. The goals of warehouse automation include the efficient use of space resources, and the elimination of manual steps of the order fulfillment process such as depalletization, and to optimize the efficiency of material handling and order fulfillment processes. Warehouse automation technology is useful for multiple reasons, such as, to make material handling processes more efficient, to lower overall costs, to improve worker safety by mitigating ergonomic risks, and to help reduce the occurrences of human error.

SUMMARY

This document describes systems and methods for enhancing warehouse material handling operations. For example, this document describes automation systems and methods that make depalletization processes more safe and efficient. In some examples, the depalletization systems described herein include multiple work cells/stations and a depalletization robot that traverses the work cells/stations on a rail so the robot can autonomously move between the stations.

While the depalletization robot works in one of the multiple stations, a worker can move an empty pallet out of another station and/or move a full pallet into the station while the robot continues to work. If there is a jam or some type of problem in one work station, an alarm can be triggered for a worker to come and address the problem while the depalletization robot moves on to depalletize in another work station. In these example ways, the downtime of the depalletization robot is minimized.

Also, as described further below, the depalletization systems described herein include safety devices so that human workers are not endangered by the depalletization robot while the workers are also performing work in or around the work cells. For example, in some embodiments there can be automatic doors between the depalletization robot and each work cell. In such as case, the worker would only go into the work cell when the door is closed. In addition, in some embodiments there are light curtains, motion sensors, and/or physical barriers (e.g., fencing) that provide additional safety features.

In one aspect, this disclosure is directed to a system for depalletization that includes multiple depalletization workstations. Each of the depalletization workstations is configured to receive a respective pallet or cart of items such as boxes, cartons, totes etc. The depalletization system also includes an output conveyor extending along the multiple workstations. The output conveyor is configured to receive and transport individual items of the pallets of items.

The depalletization system also includes a depalletization robot including an end effector. The depalletization robot is configured to travel along the multiple workstations. Accordingly, the pallets of items in each of the workstations is accessible by the end effector of the depalletization robot. The depalletization system also includes a control system in electrical communication with the depalletization robot and other sensors and devices of the depalletization system.

Such a depalletization system may optionally include one or more of the following features. For example, in some embodiments the control system is configured to provide an output signal to initiate a movement of the depalletization robot away from a first workstation of the multiple workstations to a second workstation of the multiple workstations in response to receiving a signal that indicates that a first pallet of items in the first workstation is empty of the items. Moreover, in some embodiments the control system is configured to provide an output signal to initiate a movement of the depalletization robot away from a first workstation of the multiple workstations to a second workstation of the multiple workstations in response to receiving a signal that indicates the detection of an issue that inhibits the depalletization robot from further depalletization at the first workstation. Such an issue may require involvement by a worker to resolve the issue, for example. In another example, in some embodiments the control system is configured to provide an output signal to initiate a movement of the depalletization robot away from a first workstation of the multiple workstations to a second workstation of the multiple workstations in response to receiving a signal that indicates that a worker has requested physical access to the first workstation.

In some embodiments, the end effector of the depalletization robot is configured to simultaneously releasably couple with multiple items of the pallet of items. In some cases, at least two of the multiple items in a layer of items have differing top surface elevations. The end effector of the depalletization robot can include multiple suction cups configured to simultaneously releasably couple with the multiple items in a layer of items. In some embodiments, the multiple suction cups have individual spring suspensions to facilitate the engagement of the suction cups with the layer of items that have differing top surface elevations. The multiple items to which the end effector of the depalletization robot simultaneously releasably couples with can be an entire layer of the items from the pallet of items.

In some embodiments, adjacent workstations of the multiple workstations are separated by a respective partition. Such a partition can be fencing, rails, walls, light curtains, LEXAN/plexiglass, and the like.

In some embodiments, the depalletization system includes multiple doors. For example, in some embodiments each workstation of the multiple workstations is separated from the depalletization robot by a respective door of the multiple doors. The opening and closing of each door of the multiple doors can be automatically controlled by the control system of the depalletization system using a scheme that is focused on protecting workers who need to enter the workstations at times. For example, in some embodiments the control system controls a first door of the multiple doors to be open while the depalletization robot is accessing a first workstation of the multiple workstations and all other doors of the multiple doors to be closed while the depalletization robot is accessing the first workstation of the multiple workstations.

In some embodiments, the depalletization system includes multiple light curtains. For example, in some embodiments worker access to each workstation of the multiple workstations is via a respective light curtain of the multiple light curtains. In some embodiments, there are respective light curtains between each of the workstations and the positions at which the depalletization robot accesses the respective workstations. In some embodiments, an actuatable physical barrier (e.g., an automated door) is located between each of the workstations and the positions at which the depalletization robot accesses the workstations.

In some embodiments, the depalletization system includes a respective vision system associated with each workstation of the multiple workstations. The vision systems are in communication with the control system. For example, in some embodiments the vision systems and control system are configured to determine positions of a highest level of items on the pallet of items in each workstation. In some embodiments, the vision systems and control system are configured to determine the positional coordinates and/or orientations of the levels of the items on the pallet of items in each workstation.

In another aspect, this disclosure is directed to a method for depalletization of items from pallets, carts, or any other type of item agglomeration means. The method for depalletization includes actuating, by a control system of a depalletization system, a robot of the depalletization system. The robot of the depalletization system is configured to traverse between multiple depalletization workstations. The actuating by the control system causes the robot to move, for example, from a first depalletization workstation of the multiple depalletization workstations to a second depalletization workstation of the multiple depalletization workstations. The method for depalletization also includes actuating, by the control system, the robot to engage with and remove a top layer of items from a pallet in the second depalletization workstation to thereby expose a second layer of items on the pallet. The method for depalletization also includes actuating, by the control system, the robot to transfer the top layer of items from the pallet to a conveyor. The method for depalletization also includes actuating, by the control system, the robot to engage with the second layer of items from the pallet and to transfer the second layer of items to the conveyor. Such actuations of the robot can continue until the pallet is emptied of items.

Such a method of depalletization may optionally include one or more of the following features. In some embodiments, in response to the pallet being emptied of items, the control system actuates the depalletization robot to move from the second depalletization workstation to a different depalletization workstation of the multiple depalletization workstations. The method may also include, after the robot has moved from the second depalletization workstation to the different depalletization workstation, actuating, by the control system, a door to close between the robot and the second depalletization workstation.

In some embodiments, the top layer of items on the pallet includes items with top surfaces that are at differing elevations.

In some embodiments, in response to an input to the control system, the control system: (i) actuates the robot to move from the second depalletization workstation to a different depalletization workstation of the multiple depalletization workstations and (ii) after the robot has moved from the second depalletization workstation to the different depalletization workstation, actuates a door to close between the robot and the second depalletization workstation.

In some embodiments, in response to an input to the control system from a light curtain associated with the second depalletization workstation, the control system causes a stop to all motion of the robot while at least a portion of the robot is within the second depalletization workstation.

The systems and processes described here may be used to provide one or more of the following optional benefits. First, the depalletization systems described herein are advantageously designed accommodate "mixed pallets." Mixed pallets contain two or more different types of SKU items (rather than being all the same type of SKU item). Accordingly, the depalletization systems are flexible and usable with many different types of materials including mixed pallet loads that have multiple different kinds of packaging materials.

Second, worker safety enhancements are provided by the systems and processes described herein. The need for manual lifting is reduced. In addition, other manual tasks (such as twisting and reaching while holding the weight of boxes) that workers generally perform for depalletization in accordance with conventional methods are reduced or eliminated. Accordingly, the potential for worker injuries is advantageously reduced.

Third, labor costs associated with depalletization processes can be reduced using the automated systems and processes described herein. Productivity is improved. That is, because of automation, fewer human workers are required for the depalletization processes described herein. In addition, the automated systems for depalletization described herein can handle more boxes per hour than conventional methods that are more manual-based.

Fourth, some embodiments of the depalletization systems include multiple workstations that provide operational redundancy. That is, if an interruption occurs while depalletization is taking place in one workstation, the robotic system can move on to another workstation while the source of the interruption is resolved. Accordingly, system downtime is minimized by the workstation redundancy.

Fifth, in some cases warehouse space requirements can be reduced using the automated systems and processes described herein.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing warehouse material handling operations. For example, this document describes automation systems and methods that make depalletization processes more safe and efficient. In some examples, the depalletization processes can largely be performed robotically. In addition, in some embodiments the systems for the depalletization processes can include multiple workstations to enhance the utilization of the depalletization robot, as described further below.

Figure 1:
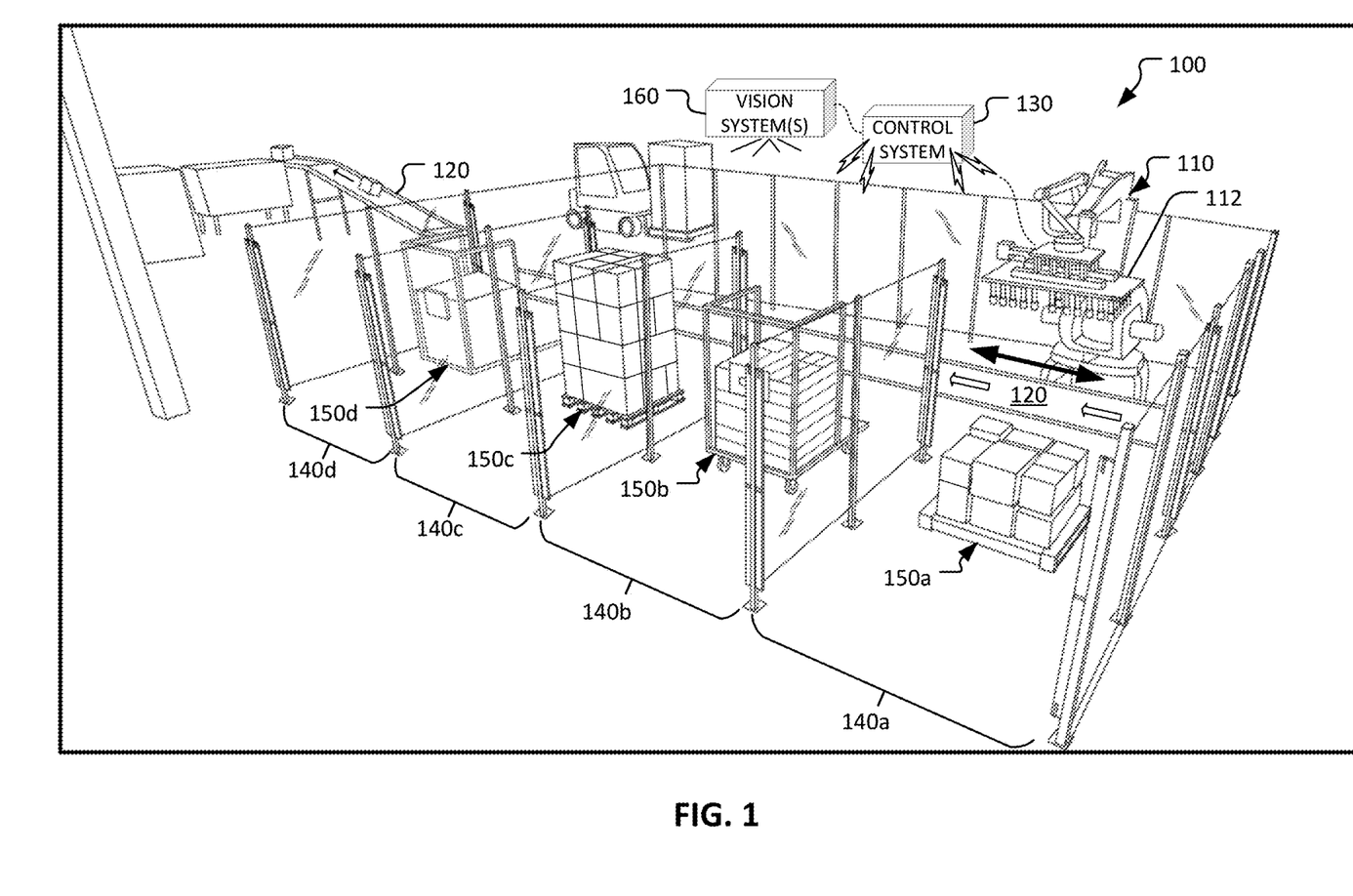
FIG. 1 depicts a first example warehouse depalletization system in accordance with some embodiments.

FIG. 1 depicts an example warehouse depalletization system 100. Such a depalletization system 100 can be used beneficially in any number of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "warehouse" may be used to refer to any and all such different types of facilities, and combinations thereof.

The depalletization system 100 includes, broadly speaking, a depalletization robot 110, an output conveyor 120, a control system 130, and multiple workstations 140a, 140b, 140c, and 140d (or 140a-d collectively). Other devices and systems are also included, as described further below.

The depicted example depalletization system 100 includes four workstations 140a-d. However, in practice, the inventive concepts of the depalletization system 100 can be applied to depalletization operations that have fewer than four or more than four workstations. For example, in some embodiments two workstations or three workstations are included in the depalletization system. In other cases, more than the four workstations 140a-d are included, such as five, six, seven, eight, nine, ten, or more than ten workstations.

Each workstation can receive and contain a pallet of items, or other type of container of items. For example, in the depicted arrangement, the workstation 140a contains a pallet of items 150a. The workstation 140b includes a cart of items 150b. The workstation 140c includes a pallet of items 150c, and the workstation 140d includes a cart of items 150d. To keep the description of the depalletization system 100 clear, hereinafter the items in the workstations will be referred to as a "pallet" of items. However, it must be understood that the term "pallet" represents any other type of suitable item agglomeration means such as, but not limited to, carts, bin, totes, bags, cartons, containers, and the like, without limitation.

Each pallet of items, such as the pallet of items 150a for example, has on it, or is carrying, multiple items. In the depicted example, the pallet of items 150a has multiple boxes on it. While boxes are used here as to represent the "items" in the depicted example, it should be understood that the boxes are representative of various other types of items. For example, the items can be reusable containers, totes, bulk packs, shrink-wrapped packages, bags, cartons, and the like, without limitation.

Each pallet of items can include multiple items that are all the same (which can also be referred to as a "homogeneous pallet"), or alternatively can include multiple items that are not all the same (which can also be referred to as a "mixed pallet"). The depalletization system 100 can operate with both/either homogeneous pallet and/or mixed pallets, and combinations thereof. For example, the pallet of items 150a is a mixed pallet.

In general, the items on a pallet are arranged in layers. That is, for example, the pallet of items 150a has two layers of items. In another example, the pallet of items 150c has four layers of items. The depalletization system 100 described herein can operate with pallets that have any number of layers of items.

In some cases, such as the example pallet of items 150a, the top surfaces of the items of a layer of items are at differing elevations. Said another way, some layers of items are comprises of two or more items that have upper surfaces that are uneven with each other. For example, the upper left box of the top layer of items on the pallet of items 150a has a top surface that is above the top surfaces of the items that are adjacent to it. This unevenness is common in the context of mixed pallets. In contrast, homogeneous pallets will typically not have such unevenness.

The depalletization system 100 described herein is operable to depalletize mixed pallets and/or homogeneous pallets. Moreover, the depalletization system 100 described herein is operable to depalletize layers of items that are even and/or uneven. That is, the depalletization system 100 can depalletize layers of items that have differing top surface elevations (such as depicted by the pallet of items 150a).

The depalletization system 100 includes the depalletization robot 110. The depalletization robot 110 can traverse along the multiple workstations 140a-d, as indicated by the heavy double-ended arrow in FIG. 1. For example, in the depicted arrangement the depalletization robot 110 is in alignment to work within the workstation 140a. In other arrangements, the depalletization robot 110 can be aligned with any of the other workstations 140b-d. The movements of the depalletization robot 110 between the workstations 140a-d are initiated and controlled by the control system 130.

In the depicted embodiment, the depalletization robot 110 can traverse along the multiple workstations 140a-d along a floor-mounted rail that extends along the multiple workstations 140a-d (and, in the depicted example, along the conveyor 120). In some embodiments, the depalletization robot 110 can traverse along the multiple workstations 140a-d along an overhead rail that extends along the multiple workstations 140a-d.

The depalletization robot 110 is an articulated robot that includes an end effector 112. While various types of end effectors can be used with the depalletization robot 110, in the depicted embodiment the end effector 112 include multiple suction cups. The multiple suction cups are configured to releasably couple with the uppermost layer of items from a pallet of items 150a-d.

In some embodiments, the multiple suction cups of the end effector 112 are configured to couple with a layer of items that have top surfaces at differing elevations (such as depicted by the pallet of items 150a). For example, in some embodiments the multiple suction cups of the end effector 112 include spring suspensions. That is, in some embodiments certain suction cups, or groups of suction cups, have suspension mechanisms that allow those suction cups to vertically adjust to the elevation of the top surface of the items. Accordingly, the spring suspensions of the multiple suction cups of the end effector 112 enable the end effector 112 releasably couple with a layer of items that have top surfaces at differing elevations (such as depicted by the pallet of items 150a).

The depalletization system 100 also includes the control system 130. The control system 130 can include one or more programmable computer processors with accessible memory, and/or can include portions that use simply relay logic in some embodiments. The control system 130 can broadly include and encompass multiple components such as, but not limited to, programmable logic controllers (PLC), relays, motor drives, sensors, and various other input and output devices for interacting with and controlling the depalletization robot 110 and other aspects of the depalletization system 100.

The control system 130 can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The computer programs of the control system 130 (also known as programs, software, software applications or code) can include machine instructions for a programmable processor, and can be implemented in a high-level procedural and/or object-oriented programming language, and/or in assembly/machine language.

In some embodiments, the control system 130 includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the control system 130 can be interconnected by any form or medium of digital data communication (e.g., a communication network). Examples of communication networks include a local area network (LAN), a wide area network (WAN), and the Internet.

To provide for interaction with a user, control system 130 can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The control system 130 can include clients and servers. A client and server are generally remote from each other and typically interact through a communication network. The relationship of client and server arises by virtue of computer programs running on the respective computers and having a client-server relationship to each other.

The control system 130 receives input signals, processes the input signals in accordance with programmed logic, and emits output signals to control movements of the depalletization robot 110 and other systems/devices of the depalletization system 100.

The depalletization system 100 also includes the output conveyor 120. The output conveyor 120 receives the items that the depalletization robot 110 picks up and transfers to the output conveyor 120. The output conveyor 120 can be any type of conveyor including but not limited to, a belt conveyor, a roller conveyor, a link conveyor, and the like, and combinations thereof. The output conveyor 120 transfers the items away from the depalletization system 100 to a subsequent downstream warehouse process, to a retail store, and the like, without limitation. In some embodiments, the output conveyor 120 includes devices for singulation of the items. That is, because some separation between items on the output conveyor 120 may be desirable (e.g., for barcode scanning of the items), a singulation device can be included to facilitate such separation of items.

The output conveyor 120 extends along the workstations 140*b-d*. In the depicted embodiment, the output conveyor 120 is positioned between the workstations 140*b-d* and the depalletization robot 110. Accordingly, the motions of the depalletization robot 110 are minimal when the depalletization robot 110 transfers the items from the pallets 150*a-d* to the output conveyor 120. This arrangement also enables the depalletization system 100 to operate at a high rate of depalletization efficiency.

Other features, systems and devices can be optionally included in some embodiments of the depalletization system 100. For example, in some embodiments the depalletization system 100 includes one or more vision systems 160. The one or more vision systems 160 can be comprised of one or more video cameras (e.g., one or more cameras used in conjunction with image-analysis software), 3D vision recognition systems, lasers, ultrasonic sensors, and the like, and combinations thereof.

Some embodiments of the depalletization system 100 include an individual dedicated vision system 160 for each workstation of the workstations 140*a-d*. Alternatively, in some embodiments of the depalletization system 100 a single vision system 160 can be used for two or more (or all) of the workstations of the workstations 140*a-d*. In some embodiments, the one or more vision systems 160 overhang the workstations 140*a-d* from above.

The one or more vision systems 160, in conjunction with the control system 130, can perform various functions. For example, in some embodiments the one or more vision systems 160 can facilitate a determination of the elevation of the top surfaces of the uppermost layer of the items on the pallets 150*a-d*. That determined elevation can then be used by the control system 130 to actuate depalletization robot 110 appropriately to couple with the uppermost layer of the items on the pallets 150*a-d*. In some embodiments, the vision systems 160 and control system 130 are configured to determine the positional coordinates and/or orientations of the items on the pallets 150*a-d* in each workstation.

In yet another example, the one or more vision systems 160, in conjunction with the control system 130, can facilitate a determination of whether the items on the pallets 150*a-d* have been completely removed. When the items on a pallet of the pallets 150*a-d* have been completely removed, then the control system 130 can actuate the depalletization robot 110 appropriately to move on to working on another pallet of the pallets 150*a-d* that has items on it.

In still another example, the one or more vision systems 160, in conjunction with the control system 130, can facilitate a determination of the position and the orientation of the pallets 150*a-d* within the workstations 140*a-d*. For example, workers typically move the pallets 150*a-d* into the workstations 140*a-d* using a pallet jack (or on wheels as in the case of a cart, e.g., see pallet 150*b* in workstation 140*b*). Accordingly, the physical placement of the pallets 150*a-d* within the workstations 140*a-d* will be at least slightly different from situation to situation (pallet to pallet). The one or more vision systems 160, in conjunction with the control system 130, can determine the actual position and the orientation (or coordinates) of the pallets 150*a-d* within the workstations 140*a-d* and then the control system 130 can actuate the depalletization robot 110 appropriately to accurately couple with the items that are on the pallets 150*a-d*. In some embodiments, the one or more vision systems 160, in conjunction with the control system 130, can determine the actual position and the orientation (or coordinates) of the layers of the items on a pallet of the pallets 150*a-d* (e.g., even if the layer of the items is a partial layer, including a single item).

In some embodiments, the workstations 140*a-d* are separated by partitions. The partitions can be various types of partitions including, but not limited to, fencing, rails, or walls.

In some embodiments, the workstations 140*a-d* include safety features such as light curtains and/or other types of sensors that are in communication with the control system 130. For example, a respective light curtain can be located at the entrance to each of the workstations 140*a-d*. If the depalletization robot 110 is operating in a particular workstation and the light curtain of that particular workstation is "broken" (e.g., the light curtain senses that a person has moved at least somewhat into the particular workstation), then the control system 130 can immediately stop the movements of the depalletization robot 110 for safety sake.

In another example, when a light curtain senses that a worker is working in a particular workstation (e.g., moving a pallet into or out of a particular workstation), when the depalletization robot 110 completes its depalletization process in another workstation, then the control system 130 can refrain moving the depalletization robot 110 to the workstation in which the worker is working. In some embodiments, one or more other types of sensors can be used such as, but not limited to, motion sensors, ultrasonic sensors, optical sensors, and the like, and combinations thereof.

In some embodiments, one or more switch devices can be located near the entrance to each of the workstations 140*a-d*. Such switch devices can be in communication with the control system 130 and can be used by workers when there is a need to enter a workstation of the workstations 140*a-d*. For example, by activating such a switch device prior to entering a particular workstation, the control system 130 will prevent the depalletization robot 110 from entering the particular workstation. Or, if the depalletization robot 110 is in the particular workstation, the control system 130 can cause the depalletization robot 110 to immediately stop all motion ("freeze") in response to the activation of the switch device. After the worker is done with physically being within the particular workstation, the worker can reset the switch device to indicate to the control system 130 that the depalletization robot 110 can enter the particular workstation as necessary.

In some cases during a depalletization process, the depalletization robot 110 and/or control system 130 may encounter a problem that requires a worker's intervention. This can be termed an "alarm condition." In such a case, a notification regarding the alarm condition can be provided to a worker. The alarm condition notification can be of various modalities such as, illumination of a light, an audible alarm, a SMS message, and the like, and combinations thereof. In the meantime while waiting for the resolution of the problem, the depalletization robot 110 can move on to performing depalletization in another workstation. In response to the alarm condition notification, the worker can report to the workstation that has the problem, resolve the problem, and reset the alarm condition. Thereafter, the depalletization robot 110 can return to the workstation that had the problem and continue the depalletization process.

Figure 2:
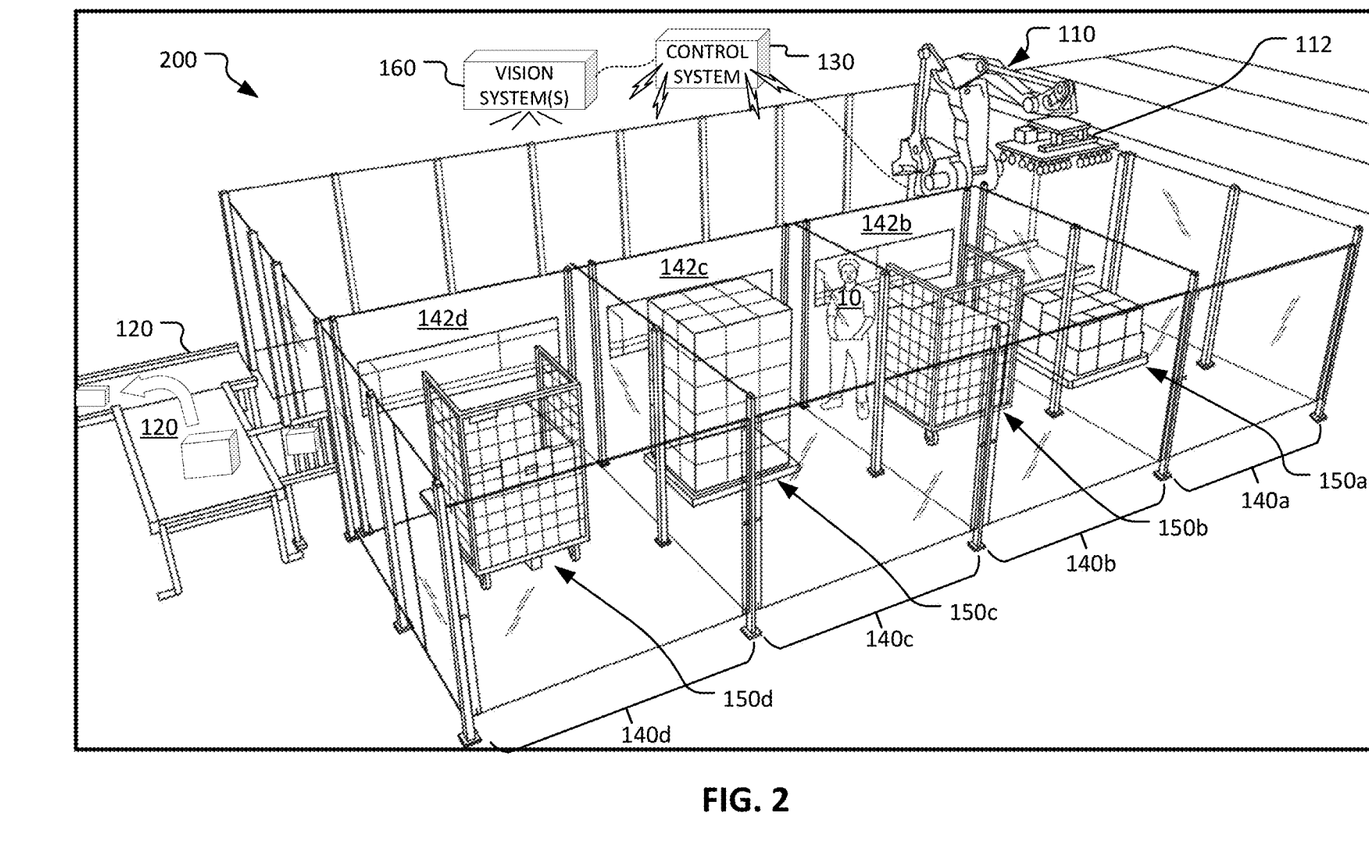
FIG. 2 depicts a second example warehouse depalletization system in accordance with some embodiments.

FIG. 2 depicts another example depalletization system 200. The depalletization system 200 is a variation of the depalletization system 100 described above. The depalletization system 200 includes many of the same systems that the depalletization system 100 includes. Those same systems are identified by the same reference numbers (e.g., the depalletization robot 110 with the end effector 112, the output conveyor 120, the control system 130, the workstations 140*a-d*, the vision system 160, etc.).

The depalletization system 200 also includes doors 142*a* (not visible), 142*b*, 142*c*, and 142*d* (collectively "doors 142*a-d*"). In the depicted embodiment, each of the workstations 140*a-d* has a respective door 142*a-d*. The doors 142*a-d* are located between the depalletization robot 110 and the respective workstations 140*a-d*.

The doors 142*a-d* are actuatable by the control system 130. That is, the control system 130 can send signals to open and/or close each of the doors 142*a-d* individually. In FIG. 2, door 142*a* is open, while the other doors 142*b-d* are closed.

Door 142*a* is open in the depicted arrangement of the depalletization system 200 because the depalletization robot 110 is actively performing depalletization in the workstation 140*a*. That is, the depalletization robot 110 is actively in the process of moving items from the pallet 150*a* to the output conveyor 120.

The doors 142*b-d* are closed in the depicted arrangement of the depalletization system 200 because the depalletization robot 110 is not currently active in any of the workstations 140*b-d*. For the depalletization robot 110 to begin working in any workstation of the workstations 140*b-d*, the respective door of the doors 142*b-d* would first have to be opened (e.g., by actuation from the control system 130).

The doors 142*a-d* serve as a worker safety system. That is, when any one of the doors 142*a-d* is closed, that provides an indication that the respective workstation(s) 140*a-d* is not going to accessed by the depalletization robot 110 (as long as the door is closed). Accordingly, a worker 10 can be within the workstation(s) 140*a-d* that have a closed door, as depicted by the worker 10 in the workstation 140*b* for example.

Moreover, since, as described above, the control system 130 can sense when a worker 10 is within a particular one of the workstations 140*a-d*, the control system 130 can keep the respective door of the particular workstation closed as long as the worker 10 is in the particular workstation. This serves to protect the safety of the workers 10 that are within any of the workstations 140*a-d*.

In some cases, when a worker 10 is within a particular one of the workstations 140*a-d*, the control system 130 can stage the depalletization robot 110 in a position where it is ready to work within the particular one of the workstations 140*a-d* when the worker 10 exits the particular one of the workstations. However, the control system 130 will not allow the depalletization robot 110 to begin working in the particular on of the workstations 140*a-d* until the worker 10 has left.

In some embodiments, the doors 142*a-d* are roll-up doors. Alternatively, in some embodiments the doors 142*a-d* are another style of door such as, but not limited to, a bi-fold door(s), a sliding door(s), and the like, without limitation.

In some embodiments, the depalletization systems 100/200 described herein are configured to allow a worker 10 to manually depalletize from a pallet within a particular one of the workstation 140a-d while the depalletization robot 110 is operating in another one of the workstation 140a-d. That is, the worker 10 can move items from the pallet within the particular one of the workstation 140a-d to the output conveyor 120, while at the same time the depalletization robot 110 is moving items from the pallet in another one of the workstation 140a-d to the output conveyor 120. Safety systems are utilized to ensure the safety of the worker 10 from the potential of harms from the depalletization robot 110 in such a scenario. For example, in some embodiments light curtains can be employed between the workstations 140a-d that will cause the depalletization robot 110 to immediately stop when tripped. In addition, in some embodiments controls that can be activated by the worker 10 can be included to request the opening a particular one of the safety doors 142a-d for a workstation when the worker 10 is going to manually depalletize within that workstation. Again, in such a scenario the depalletization robot 110 will be controlled/restrained from potentially harming the worker 10 even while the particular one of the safety doors 142a-d is open.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A depalletization system comprising:
   multiple workstations, each workstation configured to receive a respective pallet of items;
   an output conveyor extending along the multiple workstations, the output conveyor configured to receive and transport individual items from the pallet of items;
   a depalletization robot including an end effector, the depalletization robot configured to travel along the multiple workstations such that the pallet of items in each of the workstations is accessible by the end effector, wherein the end effector is configured to simultaneously releasably couple with multiple items of the pallet of items, and wherein at least two of the multiple items have differing top surface elevations;
   a control system in electrical communication with the depalletization robot;
   multiple doors, wherein each workstation of the multiple workstations is separated from the depalletization robot by a respective door of the multiple doors; and
   multiple light curtains, wherein worker access to each workstation of the multiple workstations is via a respective light curtain of the multiple light curtains,
   wherein the control system is programmed and operable to:
   actuate the depalletization robot to move from a first workstation of the multiple workstations to a second workstation of the multiple workstations;
   actuate the depalletization robot to engage with and remove a top layer of items from a pallet in the second workstation to thereby expose a second layer of items on the pallet, wherein, in response to an input to the control system from a light curtain associated with the second workstation, the control system is configured to cause a stop to all motion of the depalletization robot while at least a portion of the depalletization robot is within the second workstation;
   actuate the depalletization robot to transfer the top layer of items to a conveyor;
   actuate the depalletization robot to engage with the second layer of items and to transfer the second layer of items to the conveyor, wherein the transfer of the second layer of items to the conveyor empties the pallet of items;
   in response to the pallet being emptied of items, actuate the depalletization robot to move from the second workstation to a different workstation of the multiple workstations; and
   after the depalletization robot has moved from the second workstation to the different workstation, actuate a door to close between the depalletization robot and the second workstation.

2. The depalletization system of claim 1, wherein the end effector includes multiple suction cups configured to simultaneously releasably couple with the multiple items.

3. The depalletization system of claim 2, wherein the multiple suction cups have individual spring suspensions.

4. The depalletization system of claim 1, wherein the multiple items are an entire layer of the items from the pallet of items.

5. The depalletization system of claim 1, wherein adjacent workstations of the multiple workstations are separated by a respective partition.

6. The depalletization system of claim 5, wherein the partitions are fencing, rails, light curtains, or walls.

7. The depalletization system of claim 1, wherein opening and closing of each door of the multiple doors is controlled by the control system.

8. The depalletization system of claim 7, wherein the control system controls a first door of the multiple doors to be open while the depalletization robot is accessing the first depalletization workstation of the multiple workstations and all other doors of the multiple doors to be closed while the depalletization robot is accessing the first depalletization workstation of the multiple workstations.

9. The depalletization system of claim 1, further comprising a respective vision system associated with each workstation of the multiple workstations and in communication with the control system, wherein the vision systems and control system are configured to determine positions of a highest level of items on the pallet of items in each workstation and to determine positional coordinates and an orientation of the items.

10. A method for depalletization comprising:
actuating, by a control system of a depalletization system, a robot of the depalletization system that is configured to traverse between multiple depalletization workstations, wherein the actuating causes the robot to move from a first depalletization workstation of the multiple depalletization workstations to a second depalletization workstation of the multiple depalletization workstations;
actuating, by the control system, the robot to engage with and remove a top layer of items from a pallet in the second depalletization workstation to thereby expose a second layer of items on the pallet, wherein, in response to an input to the control system from a light curtain associated with the second depalletization workstation, the control system is configured to cause a stop to all motion of the robot while at least a portion of the robot is within the second depalletization workstation;
actuating, by the control system, the robot to transfer the top layer of items to a conveyor;
actuating, by the control system, the robot to engage with the second layer of items and to transfer the second layer of items to the conveyor, wherein the transfer of the second layer of items to the conveyor empties the pallet of items, and
in response to the pallet being emptied of items, actuating, by the control system, the robot to move from the second depalletization workstation to a different depalletization workstation of the multiple depalletization workstations; and
after the robot has moved from the second depalletization workstation to the different depalletization workstation, actuating, by the control system, a door to close between the robot and the second depalletization workstation.

11. The method of claim 10, wherein the top layer of items includes items with top surfaces that are at differing elevations.

* * * * *